Sept. 9, 1924.

G. R. MAUPIN

TUBE EXPANDER

Filed Aug. 27, 1923

1,507,846

Inventor:
Graves R. Maupin

By Edward E. Longan
Attorney

Patented Sept. 9, 1924.

1,507,846

UNITED STATES PATENT OFFICE.

GRAVES R. MAUPIN, OF MOBERLY, MISSOURI, ASSIGNOR TO THE J. FAESSLER MANUFACTURING COMPANY, A COPARTNERSHIP COMPOSED OF JOHN W. FAESSLER, CHRISTINIA FAESSLER, LOUIS E. FAESSLER, AND GRAVES R. MAUPIN, ALL OF MOBERLY, MISSOURI.

TUBE EXPANDER.

Application filed August 27, 1923. Serial No. 659,454.

*To all whom it may concern:*

Be it known that I, GRAVES R. MAUPIN, a citizen of the United States, and resident of the city of Moberly, county of Randolph, and State of Missouri, have invented certain new and useful Improvements in Tube Expanders, of which the following is a specification containing a full, clear, and exact description, reference being had to the accompanying drawings forming a part thereof.

My invention relates to improvements in tube expanders and has for its primary object an expander for tubes which are seated in a very heavy sheet or boiler head, and especially for expanding tubes which are used in oil stills.

A further object is to construct a tube expander which will form a long seat on tubes and in which the rollers are built of sections and so arranged that the joints of one section will overlap joints of the other section and make a perfectly smooth job on the inside of the tube.

A still further object is to construct a tube expander which is so constructed that all lateral strain is imparted to the tube and none to the sheet whereby it is possible to make an absolutely tight joint and all danger of buckling the sheet is obviated.

In the construction of my device I employ a mandrel having a tapered portion 4. At one end of this tapered portion is formed a cylindrical portion 5 which is provided with openings 6. These openings are at right angles to each other and are for the reception of a bar which turns the mandrel. Formed integral with the cylindrical portion 5 is a square portion 7. The purpose of this square portion is to permit the employment of a wrench for turning the mandrel and also to permit the same to be secured to a motor or flexible shaft for a power driving means.

Figure 1:
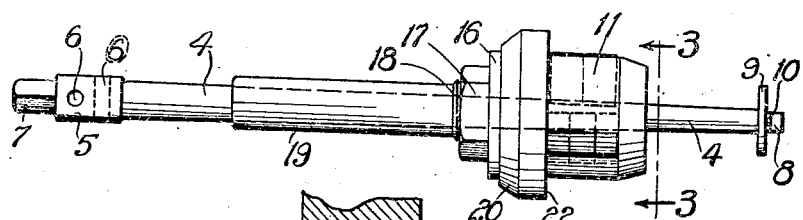
Figure 1 is a side elevation of my device.
Figure 2:
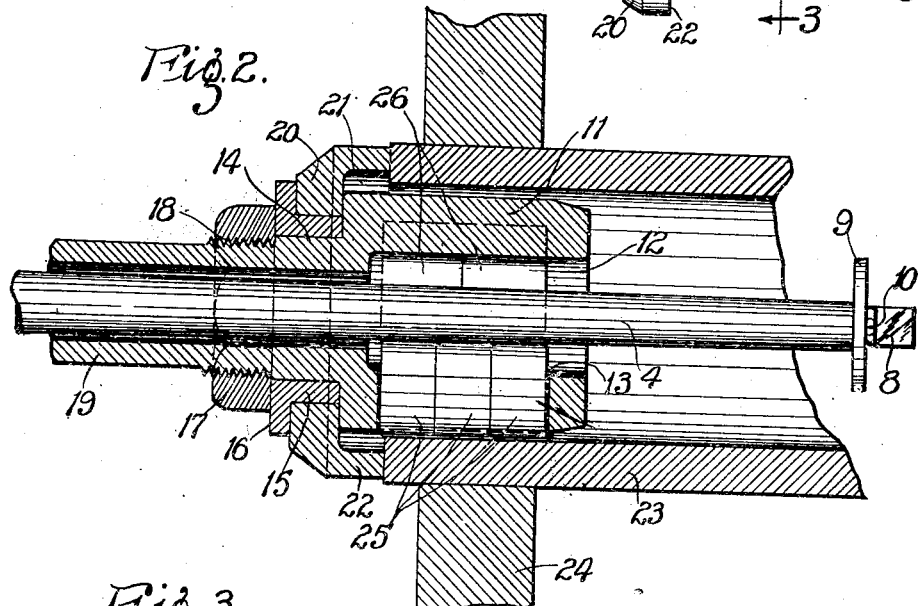
Fig. 2 is an enlarged fragmental longitudinal view of my device in position in a boiler tube and Fig. 3 is an enlarged vertical cross section taken on the line 3—3 of Fig. 1.
Figure 3:
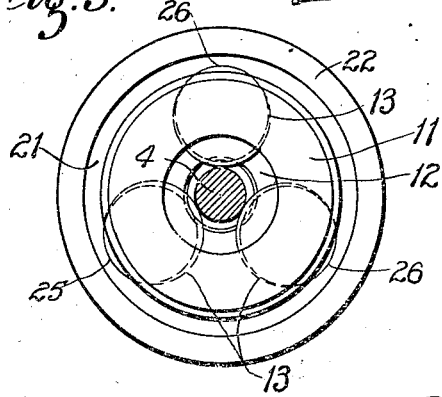

It will be noted from Fig. 1 that the enlargement 5 and the square portion 7 are adjacent the large end of the tapered portion 4. Formed integral with the small end of the tapered portion 4 of the mandrel is a cylindrical portion 8 over which is placed a disk or washer 9. This washer is for the purpose of preventing the withdrawal of the mandrel from the cage. The washer is retained in position on the cylindrical portion 8 by means of a cotter-pin 10. The mandrel is adapted to extend through a cage 11, which cage is provided with a central opening 12 of larger diameter than the mandrel. The cage is provided with a plurality of radially arranged openings 13. These openings are preferably three in number. Adjacent the rear portion of the cage 11 is a reduced cylindrical portion 14 on which is mounted a sleeve 15. One end of the sleeve 15 abuts against the cage 11, the other end is provided with a flange 16 against which a nut 17 bears. The nut 17 is secured on the screw threaded portion 18 of the sleeve 19 which is formed integral with the cage. It will be noted from Fig. 2 that the screw threaded portion 18 is slightly larger than the sleeve 19 but at the same time smaller than the portion 14, this permits the ready passage of the sleeve 15 and the nut 17. Mounted on the sleeve 15 is a collar 20 which is recessed as at 21 so as to provide a forwardly projecting flange 22. This flange is designed to come in contact with the tube 23, which tube is seated in the sheet 24. The collar 20 is designed to rotate freely on the sleeve 15 so as not to make any score marks on the edge of the tube.

Extending through some of the openings 13 are a plurality of rollers 25, preferably three in number. These rollers are located in two of the openings and in the remaining opening are located rollers 26, preferably two in number. These rollers contact with the mandrel and are adapted to be forced outward and bear against the interior of the tube 23 when the tapered portion 4 of the mandrel is fed forward.

It will be noted from Fig. 1 that the openings 13 and rollers 25 and 26 are arranged at an angle to the longitudinal axis of the cage. The purpose of this is to cause the rollers to have a feeding action on the mandrel. In other words, by rotating the mandrel in one direction the rollers will grip the mandrel and draw it forward thus expanding the rollers and by reversing the direction of rotation of the mandrel, the same is fed backward and the rollers allowed to collapse or withdraw into the cage so as to provide for a ready withdrawal of the tool.

By making the rollers 25 and 26 in sections, it is possible to construct a tool to roll a long seat for the tubes which will have the same action as when a single roller in each opening is employed, with this advantage, that it is a great deal cheaper to construct a series of sectional rollers than it is to construct one long roller for the reason that all warping and buckling during the hardening process is eliminated when short rollers are used. And by using three sections in two of the openings and two sections in the remaining opening, it is possible to break the joints of the rollers so that when the expanding job is completed, the interior of the tube will be smooth. This would not be possible were the same number of sections used in each opening because if the joints of all of the rollers came in the same place, ridges would be left on the inside of the tube due to the fact that all of the rollers have their edges broken or beveled. Another advantage of making the rollers sectional is that a great many more bearing points on the mandrel are obtained. For instance, in the construction just described, I obtain eight bearing points on the mandrel as against three when solid rollers are employed. This makes the rotation of the mandrel easier and greater expansion can be obtained in the same length of time due to the fact that I can obtain individual pressure on at least eight different points at once whereas with solid rollers pressure could be obtained only on three points and in case the tube had any soft spots, it would be harder to obtain a solid seat with the single roller than where divided rollers are employed.

I do not however, desire to limit myself to the precise number of rollers employed because it is obvious that each one of the openings may have a different number of rollers located therein, this dividing up of the rollers being optional.

The gist of my invention being the employment of a number of sectional rollers in each cage opening, which rollers are so arranged that the joints between the rollers are covered by the rollers of the succeeding section so that a smooth job will result.

My device is especially applicable to rolling in or expanding tubes in oil stills where at times the tube seat is at least six inches long and where it is almost impossible to make single rollers long enough and true enough for the work due to the fact that in hardening a long roller, the same will buckle or warp enough to render it useless.

The collar 20 acts as a thrust collar and prevents the expander from being drawn into the tube while expanding the same.

Having fully described my invention, what I claim is:—

1. A tube expander comprising a cage, a tapered mandrel extending through said cage, and a plurality of sectional rollers arranged in groups varying in number of sections located in said cage, said rollers contacting with the mandrel and adapted to be projected beyond the periphery of said cage by the action of said mandrel.

2. A tube expander comprising a cage having a plurality of radially arranged openings extending therethrough, the longitudinal axes of which are at an angle to the longitudinal axis of the cage, a plurality of sectional rollers located in said openings one of said openings containing a different number of rollers from the other openings, a mandrel extending through said cage and adapted to contact with said rollers whereby the same may be projected beyond the periphery of said cage by the insertion of said mandrel, said rollers adapted to draw the mandrel when rotated in one direction, into the cage and force it outward when rotated in the other direction, and means carried by the mandrel whereby the same may be rotated.

3. A tube expander comprising a cage, a tapered mandrel extending through said cage, and a plurality of sectional rollers located in said cage, said rollers so arranged that the sections of one set will overlap the joints of the other sets, and means for rotating said mandrel whereby the same is fed into the cage, said feeding action causing the rollers to be projected beyond the periphery of said cage.

4. A tube expander comprising a cage having a plurality of radially arranged openings extending therethrough, the longitudinal axes of which are at an angle to the axis of the cage, a plurality of sectional rollers located in said openings, said rollers so arranged that one set thereof will overlap the joints of the adjacent set of rollers, whereby the formation of ridges on the interior of the tube is prevented, a mandrel extending through said cage and adapted to contact with said rollers whereby the same may be projected beyond the periphery of the cage by the insertion of said mandrel, said rollers adapted to draw the mandrel when rotated in one direction, into the cage, and to force it outward when rotated in the opposite direction, and means carried by the mandrel whereby the same may be rotated.

In testimony whereof, I have signed my name to this specification.

GRAVES R. MAUPIN.